US012580721B2

(12) United States Patent (10) Patent No.: US 12,580,721 B2

Manjunath et al. (45) Date of Patent: Mar. 17, 2026

(54) ELECTRONIC DEVICE AND METHOD FOR SAMPLING RECEIVED DATA

(71) Applicant: Infineon Technologies AG, Neubiberg (DE)

(72) Inventors: Sunanda Manjunath, Munich (DE); Christian Müller, Künzell (DE)

(73) Assignee: Infineon Technologies AG, Neubiberg (DE)

( * ) Notice: Subject to any disclaimer, the term of this patent is extended or adjusted under 35 U.S.C. 154(b) by 78 days.

(21) Appl. No.: 18/631,133

(22) Filed: Apr. 10, 2024

(65) Prior Publication Data

US 2024/0356721 A1      Oct. 24, 2024

(30) Foreign Application Priority Data

Apr. 19, 2023 (DE) ..................... 10 2023 109 819.5

(51) Int. Cl.
*H04L 7/00* (2006.01)
*G06F 1/04* (2006.01)
(Continued)

(52) U.S. Cl.
CPC ........ *H04L 7/0012* (2013.01); *G06F 13/1689* (2013.01); *G06F 1/04* (2013.01);
(Continued)

(58) Field of Classification Search
CPC .......... G06F 1/10; G06F 1/04; G06F 13/1689; G06F 13/4243; G06F 13/4291
(Continued)

(56) References Cited

U.S. PATENT DOCUMENTS 6,003,118 A  *  12/1999  Chen ......................... G06F 1/10
                                                                 713/401
6,519,688 B1 *  2/2003  Lu ......................... G11C 7/1051
                                                                 711/167

(Continued)

FOREIGN PATENT DOCUMENTS

EP          2778943 A1      9/2014

OTHER PUBLICATIONS

ESP32 SPI Communication: Set pins, Multiple SPI Bus Interfaces, and Peripherals (Arduino IDE). https://web.archive.org/web/20230130172300/https://randomnerdtutorials.com/esp32-spi-communication-arduino/#SPI-intro. Published on Nov. 13, 2023.

*Primary Examiner* — Ji H Bae

(74) *Attorney, Agent, or Firm* — Eschweiler & Potashnik, LLC

(57) ABSTRACT

An electronic device including a master device, the master device including an interface component to a slave device. The interface component includes a sampling circuit having a clock input, a transmit clock generator configured to generate a transmit clock, a first off-chip driver configured to receive the transmit clock and provide the transmit clock to the slave device, a second off-chip driver configured to receive the transmit clock and configured to supply the transmit clock to the clock input of the sampling circuit of the interface component and a data input configured to receive data from the slave device. The sampling circuit is configured to sample the received data in accordance with the transmit clock supplied by the second off-chip driver.

11 Claims, 6 Drawing Sheets

(51) Int. Cl.
*G06F 1/10* (2006.01)
*G06F 13/16* (2006.01)
*G06F 13/42* (2006.01)

(52) U.S. Cl.
CPC ............ *G06F 1/10* (2013.01); *G06F 13/4243* (2013.01); *G06F 13/4291* (2013.01)

(58) Field of Classification Search
USPC ..... 713/400, 401, 500, 502, 600; 710/58, 61
See application file for complete search history.

(56) References Cited

U.S. PATENT DOCUMENTS

| | | | |
|---|---|---|---|
| 6,898,726 B1 * | 5/2005 | Lee ........................... | G06F 1/12 |
| | | | 375/376 |
| 7,721,010 B2 | 5/2010 | Schnell et al. | |
| 2006/0238230 A1 * | 10/2006 | Patel ...................... | G11C 7/222 |
| | | | 327/261 |
| 2014/0266373 A1 | 9/2014 | Goswami et al. | |
| 2014/0293710 A1 * | 10/2014 | Ware ........................ | G11C 7/22 |
| | | | 365/194 |
| 2017/0220517 A1 | 8/2017 | Khan et al. | |
| 2021/0241843 A1 * | 8/2021 | Kim ........................ | G11C 16/26 |

* cited by examiner

FIG 3

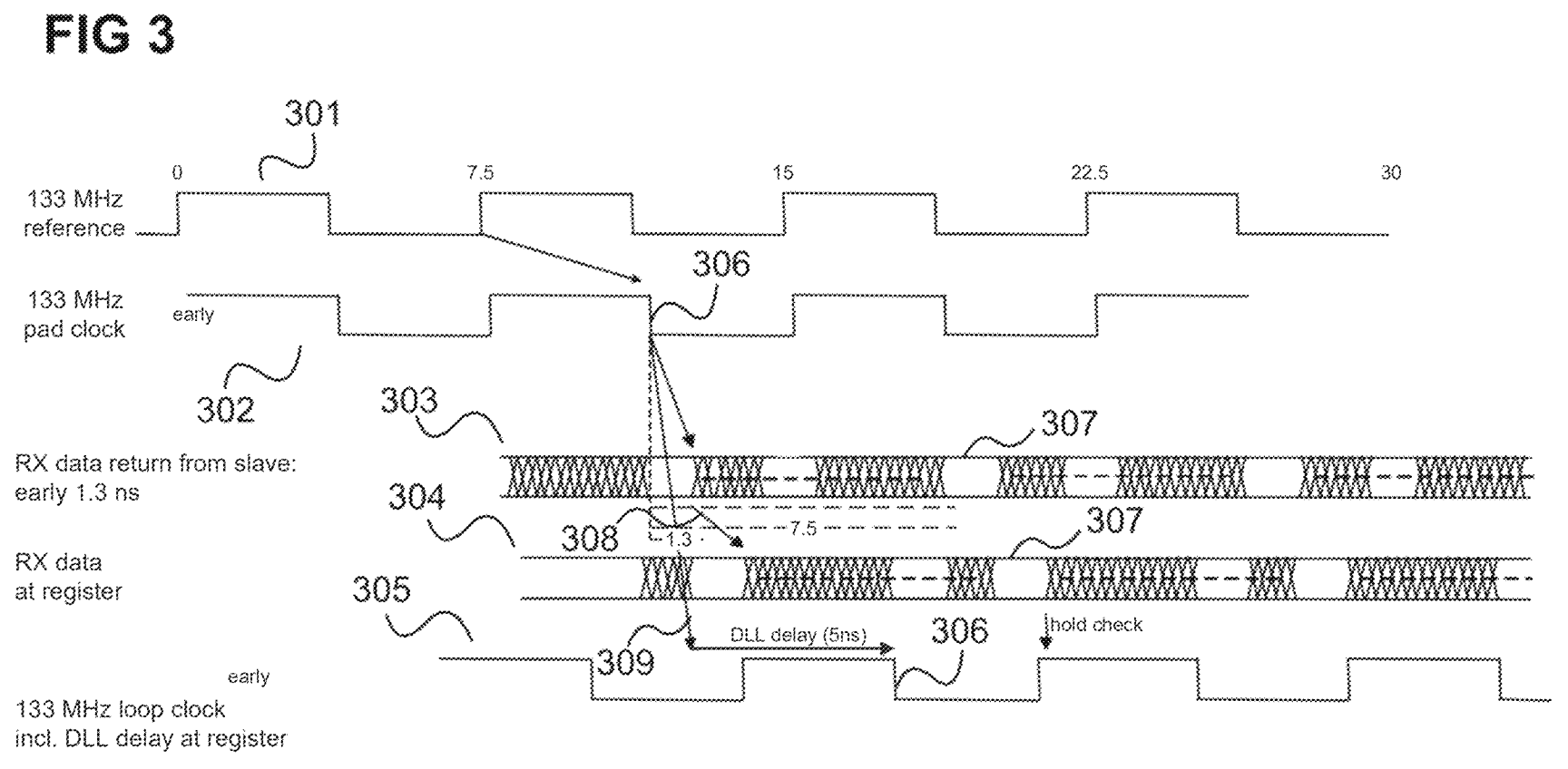

133 MHz reference    301

133 MHz pad clock    early    302

RX data return from slave: early 1.3 ns    303    306    307    307

RX data at register    304    308    309    306    307    hold check

133 MHz loop clock incl. DLL delay at register    early    305    DLL delay (5ns)

Figure 4:
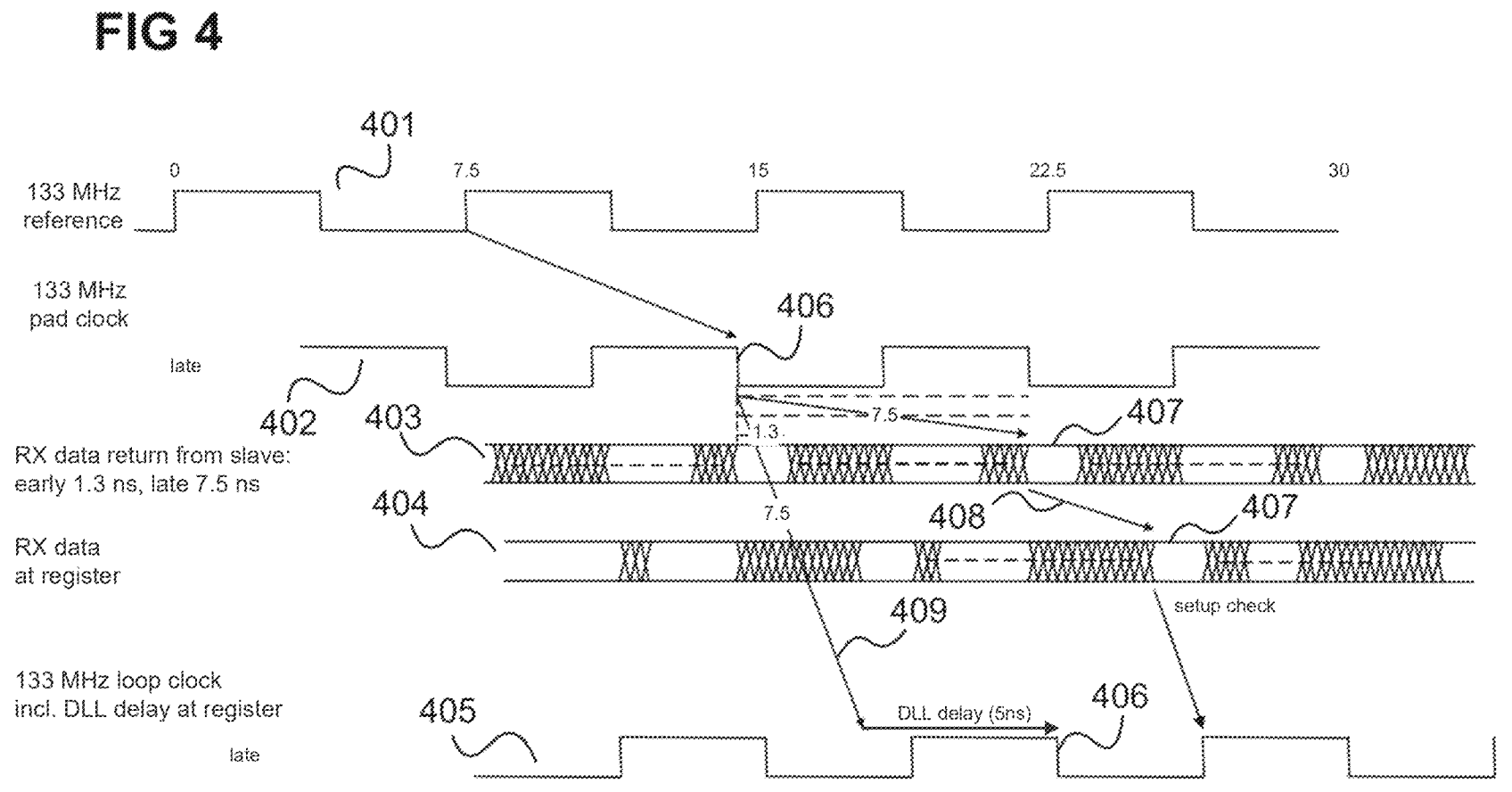

133 MHz
reference

133 MHz
pad clock

RX data return from slave:
early 1.3 ns, late 7.5 ns

RX data
at register

133 MHz loop clock
incl. DLL delay at register 401
402
403
404
405
406
407
408
409 setup check

DLL delay (5ns)

late late

ELECTRONIC DEVICE AND METHOD FOR SAMPLING RECEIVED DATA

REFERENCE TO RELATED APPLICATIONS

This application claims priority to German Patent Application 10 2023 109 819.5, filed on Apr. 19, 2023, the contents of which are hereby incorporated by reference in their entirety.

FIELD

The present disclosure relates to electronic devices and methods for sampling received data.

BACKGROUND

Integrated circuits such as a memory controller and a memory often communicate data in accordance with clock signals. However, there are transmission modes or architectures where the circuit which sends data (such as a memory in case of a read access to the memory, which may be referred to as slave device) does not send a clock signal which indicates the timing with which the circuits sends the data. This may make it difficult for the receiving circuit (such as a memory controller in case of a memory read access, which may be referred to as master device) to determine the correct timing to sample the received data, and due to the tolerances which are therefore necessary to compensate variations in the timing of the received data (e.g., process, voltage and temperature (PVT) variations), the data rate is limited in such cases. Therefore, approaches are desirable which allow adapting the sampling timing to variations of the timing of received data and thus allow increasing the data rate in the communication between two devices.

SUMMARY

According to various embodiments, an electronic device is provided comprising a master device, the master device comprising an interface component to a slave device. The interface component comprises a sampling circuit having a clock input, a transmit clock generator configured to generate a transmit clock signal, a first off-chip driver configured to receive the transmit clock signal and provide the transmit clock signal to the slave device, a second off-chip driver configured to receive the transmit clock signal and configured to supply the transmit clock signal to the clock input of the sampling circuit of the interface component, and a data input configured to receive data from the slave device. The sampling circuit is configured to sample the received data in accordance with the transmit clock signal supplied by the second off-chip driver.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of embodiments of the disclosure. In the following description, various aspects are described with reference to the following drawings, in which:

FIG. 3 shows a signal diagram illustrating receive data sampling according to various embodiments in case of low delay.

FIG. 4 shows a signal diagram illustrating receive data sampling according to various embodiments in case of high delay.

DETAILED DESCRIPTION

The following detailed description refers to the accompanying drawings that show, by way of illustration, specific details and aspects of this disclosure. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

Figure 1:
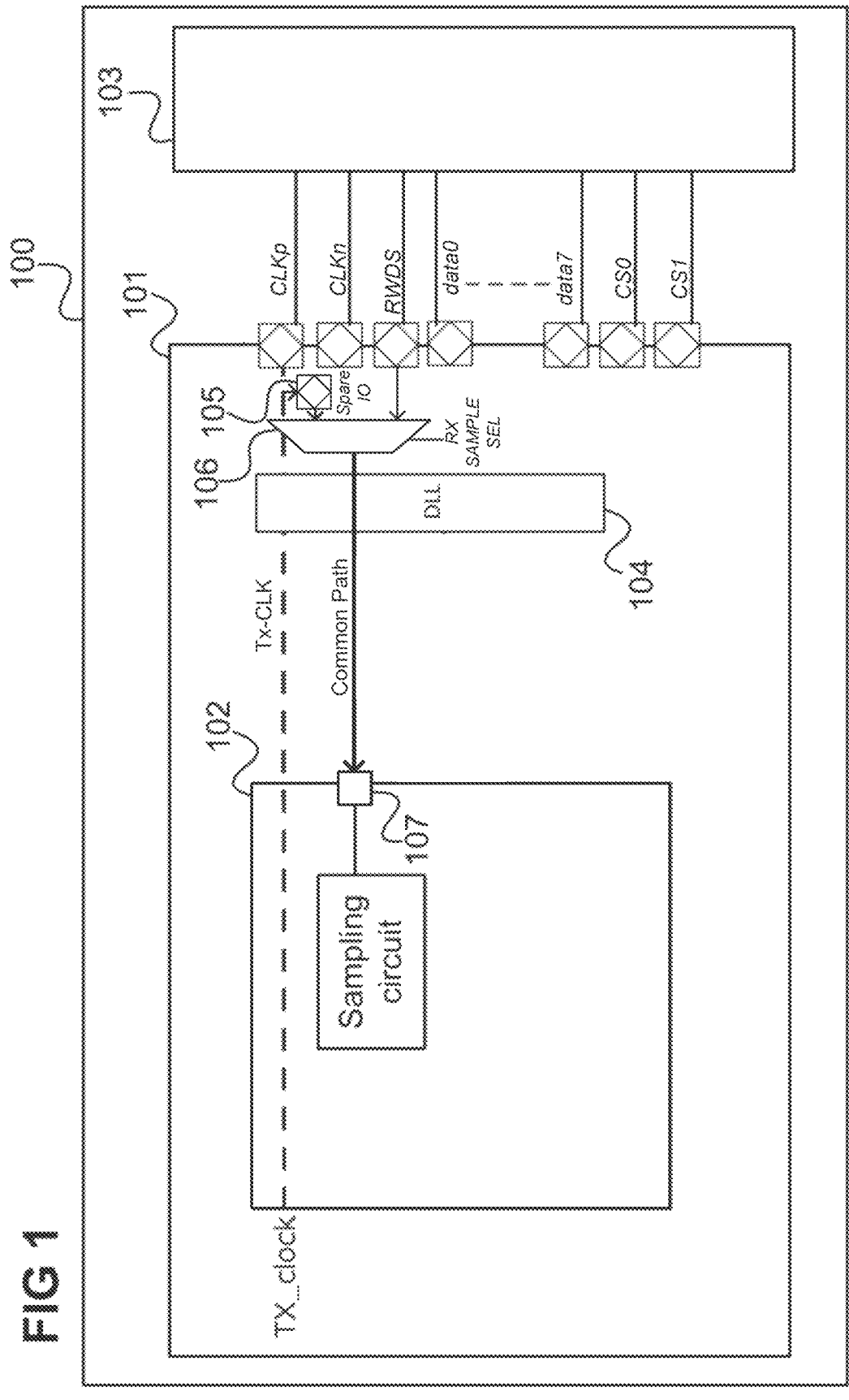
FIG. 1 shows an electronic device according to an embodiment.

FIG. 1 shows an electronic device according to an embodiment.

The electronic device 100 is for example an electronic control unit (ECU), in particular for a vehicle, but may also be a control device or data processing device for other devices like machines, power generators etc.

The electronic device 100 comprises a master device 101, such as a microcontroller, which comprises an interface circuit 102 (e.g., implementing a synchronous serial interface) for communicating with a slave device 103, such as a flash memory. The master device 101 and the slave device 103 are, for example, implemented by means of different chips (e.g. the master device comprises a microcontroller chip and the slave device comprises a memory chip) arranged together on a printed circuit board. The slave device 103 may also be external to the electronic device.

For implementing communication between the master device 101 and the slave device 103, the master device 101 comprises a plurality of terminals via which it is connected to the slave device 103. The plurality of terminals include a CLKp terminal for outputting a transmit clock signal to the slave device 103, a CLKn terminal also for outputting the transmit clock in case it is output in differential form, an RWDS (read write data strobe) by which the slave device 103 may supply a receive clock to the slave device 103 (i.e., a signal which indicates to the interface circuit 102 when to sample a data signal provided by the slave device 103 (i.e. a receive data timing signal)), and data terminals data0 to data7 by which the master device 101 may supply a (e.g., 8 bit) data signal to the slave device 103 when the master device 101 is transmitting to the slave device 103 and by which the slave device 103 may receive a (e.g., 8 bit) signal from the slave device 103 when the slave device 103 is receiving from the slave device.

In the embodiment illustrated in FIG. 1, the master device 101 further includes chip select terminals CS0 and CS1 by which the master device 101 may output chip select signals to the slave device 103, e.g. to select among multiple memory areas (e.g. banks) or flash chips.

Depending on what a terminal is used for, it is provided with a buffer circuitry (also referred to as off-chip driver) which includes an output stage (also referred to as transmit stage), an input stage (also referred to as receive stage), or both. This circuitry forms an input/output (i.e. input, output or both) circuit wherein the buffer circuitry (e.g., off-chip driver) is associated with the terminal, i.e. is buffer circuitry (e.g., an off-chip driver) of the terminal.

The interface circuit 102 is connected to the terminals for timing signals, i.e. the CLKp terminal, the CLKn terminal and the RWDS terminal, via a delay locked loop (DLL) 104. The master device 101 may comprise one or more paths for one or more outgoing timing signals (e.g. the transmit clock Tx-CLK transmitted over CLKp or both CLKp and CLKn (in case it is a differential clock signal)) and one or more paths for incoming timing signals such as the RWDS signal received over the RWDS terminal.

There are modes where the slave device 103 does not provide a receive timing signal, in this case the RWDS signal. For example, xSPI (Expanded Serial Peripheral Interface) has two modes, SDR (single data transfer rate) and DDR (double data transfer rate), which differ in particular in the sampling of received data (wherein in the following it is assumed that the slave device 103 transmits data to the master device 101, i.e. the master device 101 is receiving): DDR is usually source synchronous while SDR is not, i.e. in SDR mode, the master device 101 does not receive any clock (i.e. does not receive RWDS) from the slave device 103. Without any measures helping in the sampling, this reduces the achievable data rate drastically.

One approach to help in this sampling is so called Rx-Sample delay, which helps sampling incoming data by introducing a certain delay to a selected clock, for example the transmit clock and using that delayed clock for timing the sampling. The delay is selected by the user, via register programming. However, due to the PVT (process, voltage, temperature) variations, one universal delay set at some initial time is typically not accurate enough to get above 50 MHz read speed in SDR mode (while a read speed of well above that, e.g. from flash devices, is desirable for certain applications).

Therefore, according to various embodiments, while an incoming timing signal (RWDS in the example of FIG. 1) is used for sampling receive data received from the slave device 103 when such an incoming timing signal is provided to the master device 101, the incoming receive data is sampled using the looped-back transmit clock signal. More specifically, this means that the transmit clock signal (i.e. the positive component of the transmit clock signal in case of a differential transmit clock signal) is not only output to CLKp but also to a spare off-chip driver 105 which loops back the transmit clock signal via a multiplexer 106 (which may be switched between forwarding the RWDS signal and the looped-back transmit clock signal) and the DLL 104 to a sampling timing signal input 107 of the interface circuit 102 which uses the signal received at its sampling timing signal input 107 for setting sampling times of the receive data received from the slave device 103.

By looping back over the spare off-chip driver 105 (including the transmit stage of the spare off-chip driver 105 and the receive stage of the spare off-chip driver 105) as well as the path through the DLL 104 which would also be taken by the RWDS signal, variations (including on-chip variations) that the receive data signals undergo can be compensated with regard to the sampling timing (the data signals themselves do not go over the DLL in this example).

It should be noted that this compensation approach does not require extra terminals (such as pins or metal pads) assuming that one spare off-chip driver (with associated terminal) is available anyway and no CPU intervention is needed (e.g. to run learning calibration methods). Further, since it is not necessary to drive external load the area requirement is small.

It should be noted that the spare off-chip driver is an input/output buffer which has (as for every off-chip driver by which the master device 101 can transmit and receive data) a receive stage (implementing a receive path) and a transmit stage (implementing a transmit path).

Figure 2:
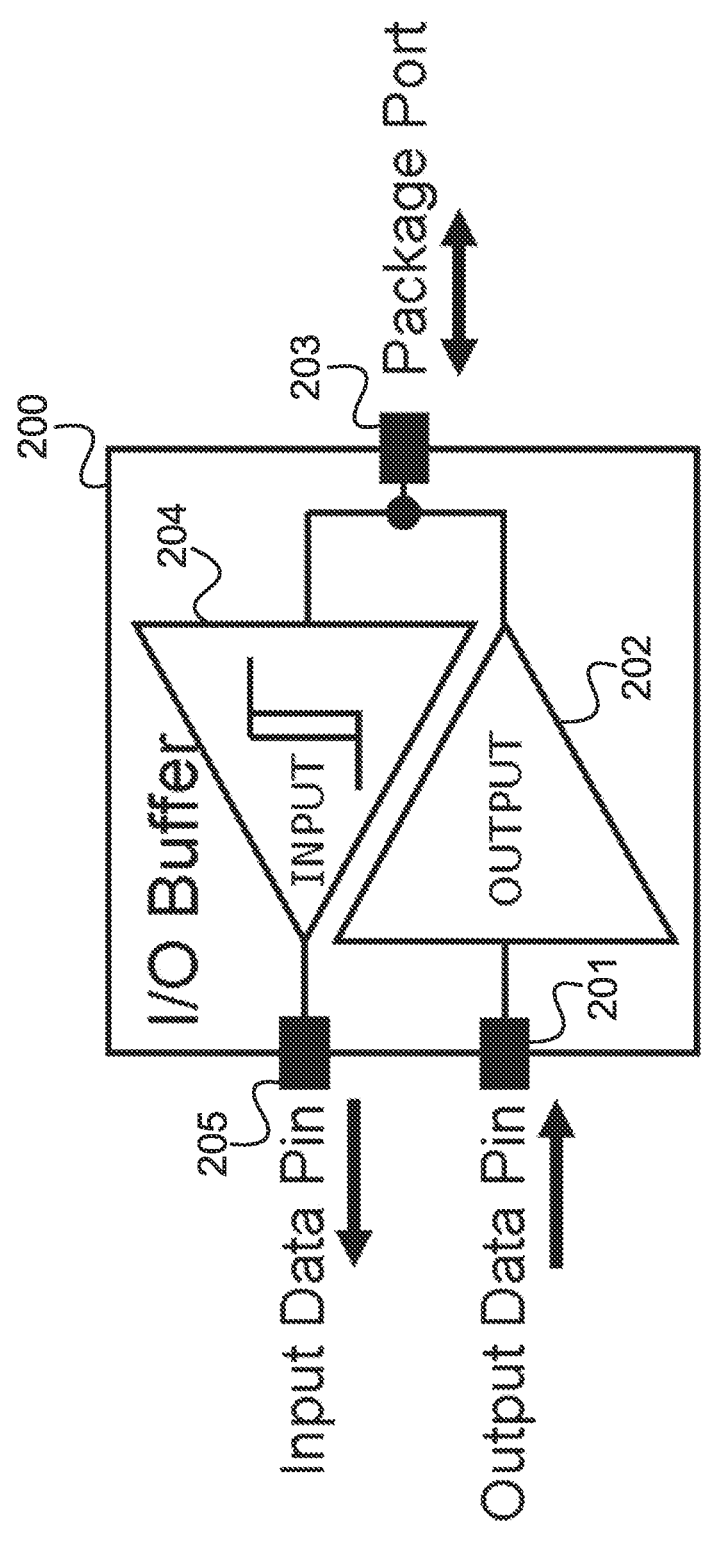
FIG. 2 shows I/O (input/output) circuitry associated with a terminal according to an embodiment.

FIG. 2 shows I/O circuitry (i.e. I/O buffer or I/O circuit or off-chip driver) 200 associated with a terminal according to an embodiment.

The I/O circuitry 200 receives the transmit clock signal via an output data pin 201 from the interface circuit 102. The interface circuit 102 is for example implemented by a chip (e.g. microcontroller chip) of the master device 101. The transmit clock signal is buffered by an output buffer (i.e. buffer amplifier, here of a transmit stage or path) 202 which applies it to a package port 203 (e.g. corresponding to the terminal) of the master device. The package port 203 is, according to various embodiments, not connected (i.e. is not connected to a device external to the master device 101). The transmit clock signal is looped from the output buffer 202 to an input buffer (i.e. buffer amplifier, here of an input stage or path) 204 which buffers the looped-back transmit clock signal and supplies it to an input data pin 205 (connected to an input of multiplexer 106 and via the multiplexer may be supplied to the interface circuit 102).

The interface circuit 102 together with the DLL 104, the off-chip drivers and the multiplexer 106 (and possible other components involved in the communication between the slave device 103 and the interface circuit 102) may be regarded as interface component (or interface circuitry) of the master device 101.

FIG. 3 shows a signal diagram 300 illustrating receive data sampling according to various embodiments in case of low delay.

The sampling is for example performed by the master device 101 when receiving data from the slave device 103 in the absence of a receive timing signal provided by the slave device 103.

A first graph 301 indicates the transmit clock signal as reference signal.

A second graph 302 indicates the timing of the transmit clock signal as present at the package port of the CLKp off-chip driver and the package port 203 of the spare off-chip driver in case of low delay (e.g., "early").

A third graph 303 indicates the timing of the receive data in case of low delay.

Sampling starts at a low edge of the sampling timing signal (which is, as explained above, the fed-back transmit clock signal). The data eye 307 corresponding to falling edge 306 is about 7.5 ns after the transmit clock signal as present at the transmit output of the spare off-chip driver 105.

The receive data gets further delayed (indicated by arrow 308) before it is present at the sampling register. A fourth graph 304 indicates the timing of the receive data at the sampling register.

The transmit clock signal gets delayed by being fed back through (the receive stage of) the spare off-chip driver 105 (indicated by arrow 309) and further by the DLL (e.g., by approximately 5 ns). This is now the sampling timing signal.

Both delays, indicated by arrows 308, 309, are relatively low in case of low delay.

In particular, the resulting timing of the falling clock edge 306, as shown by a fifth graph 305 is such that the subsequent rising edge passes the hold check for the data eye 307.

FIG. 4 shows a signal diagram 400 illustrating receive data sampling according to various embodiments in case of high delay.

The sampling is for example performed by the master device 101 when receiving data from the slave device 103 in the absence of a receive timing signal provided by the slave device 103.

A first graph 401 indicates the transmit clock signal as reference signal.

A second graph 402 indicates the timing of the transmit clock signal as present at the package port of the CLKp off-chip driver and the package port 203 of the spare off-chip driver in case of high delay (e.g., "late").

A third graph 403 indicates the timing of the receive data in case of high delay.

Sampling starts at a low edge of the sampling timing signal (which is, as explained above, the fed-back transmit clock signal). In the example of FIG. 4, the data eye 407 corresponding to falling edge 406 is about 7.5 ns after the transmit clock signal as present at the transmit output of the spare off-chip driver 105.

The receive data gets further delayed (indicated by arrow 408) before it is present at the sampling register. A fourth graph 404 indicates the timing of the receive data at the sampling register.

The transmit clock signal gets delayed by being fed back through (the receive stage of) the spare off-chip driver 105 (indicated by arrow 409) and further by the DLL (here 5 ns). This is now the sampling timing signal.

Both delays, indicated by arrows 408, 409, are relatively high in case of high delay.

In particular, the resulting timing of the falling clock edge 406, as shown by a fifth graph 405 is such that it passes the setup check for the data eye 407.

Figure 5:
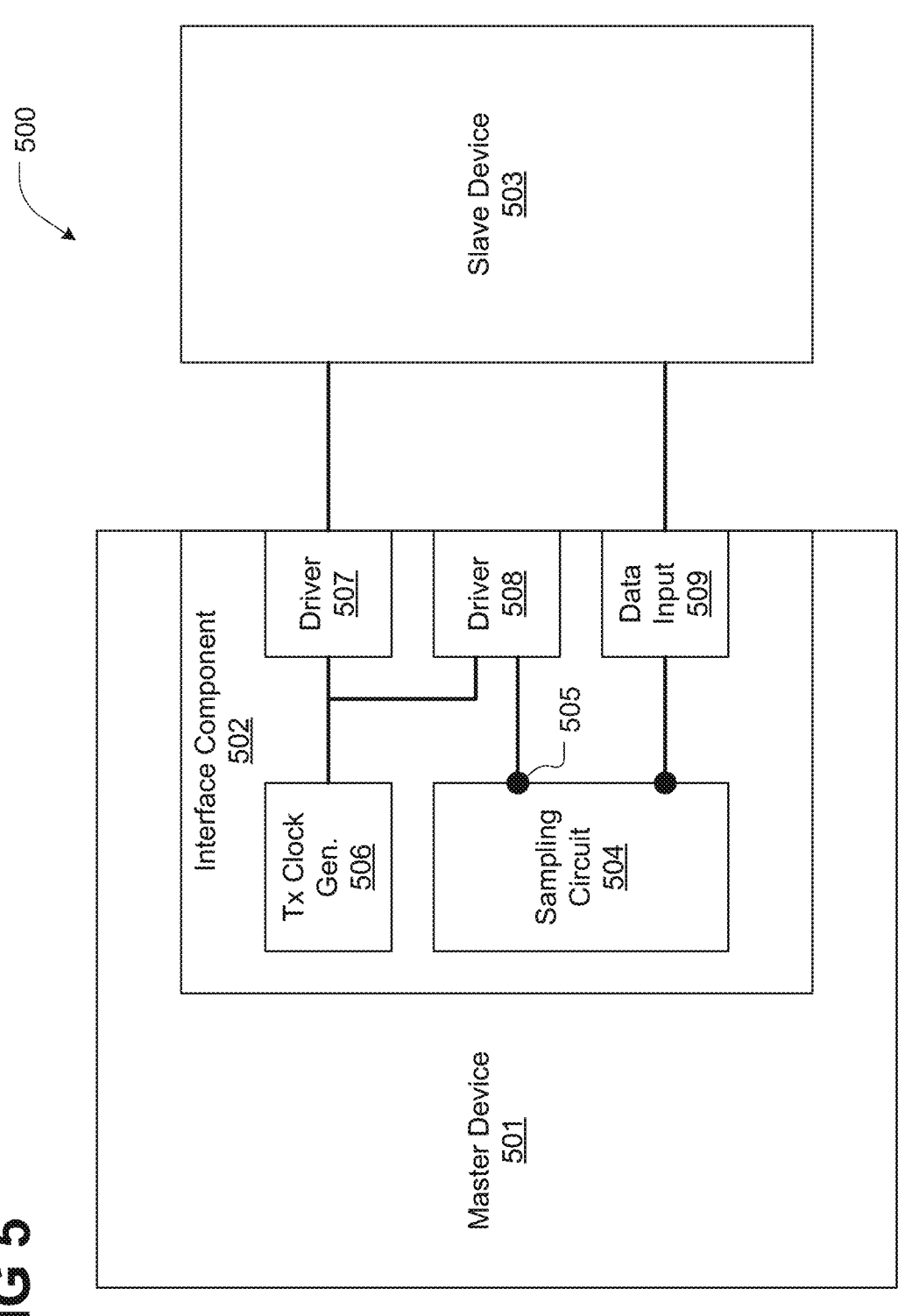
FIG. 5 shows an electronic device according to an embodiment.

FIG. 5 shows an electronic device 500 according to an embodiment.

The electronic device 500 comprises a master device 501 comprising an interface component 502 to a slave device 503 (which may or may not be part of the electronic device 500).

The interface component 502 comprises:

a sampling circuit 504 having a clock input 505;

a transmit clock generator 506 configured to generate a transmit clock (or reference clock; this may be a clock according to which data is transmitted from the master device to the slave device and which indicates the transmission timing in this case and is therefore denoted as transmit clock);

a first off-chip driver 507 (e.g., a transmit clock output off-chip driver) configured to receive the transmit clock and provide the transmit clock to the slave device 503 (e.g., via the associated terminal, i.e. a transmit clock output terminal);

a second off-chip driver 508 configured to receive the transmit clock and configured to supply the transmit clock to the clock input 505 of the sampling circuit 504 of the interface component 502 (i.e., acting as loop-back driver); and a data input 509 (e.g., implemented by one or more further off-chip drivers and associated terminals) configured to receive data from the slave device 503.

The sampling circuit 504 is configured to sample received data in accordance with the transmit clock supplied by the second off-chip driver 508 (to the clock input 505 of the sampling circuit 504).

According to various embodiments, in other words, a transmit clock signal (according to which a slave device operates, i.e. transmits data) is fed back (i.e. looped back) via an off-chip driver as a sampling clock signal to have a similar delay in the sampling clock signal as in the transmit clock signal (caused by the components of the off-chip drivers and subject to PVT variations).

The approach of FIG. 5 can be used for increasing the read bandwidth for xSPI compatible Master-slave set ups when no clock (indicating receive data timing) is received from the slave device. The looping back of the transmit clock can for example be done via a spare IO cell (including an off-chip driver), and the DLL which helps compensate the PVT variations undergone by the data lines between the master device and the slave device (used for transmitting the data and connected to the data terminals of the master device). Thus, bandwidth in a No-RWDS mode (i.e. a transmission mode where the slave device does not provide an RWDS signal) may be increased by making use of a spare off-chip driver. The usage of the spare off-chip driver in this manner does not lead to high power consumption increase because it is not driving any load. Thus, a higher read speed from a slave device may be achieved when the slave device does not provide a clock signal (indicating receive data timing) without using extra pins (from the master device to the PCB, i.e. of the package port) and without having to run any calibration algorithm periodically. The slave device is for example a memory (or memory chip), e.g. a flash memory (e.g. NAND or NOR flash).

The sampling circuit for example forwards the sampled received data to a data processing circuit (e.g. a CPU) of the master device.

Figure 6:
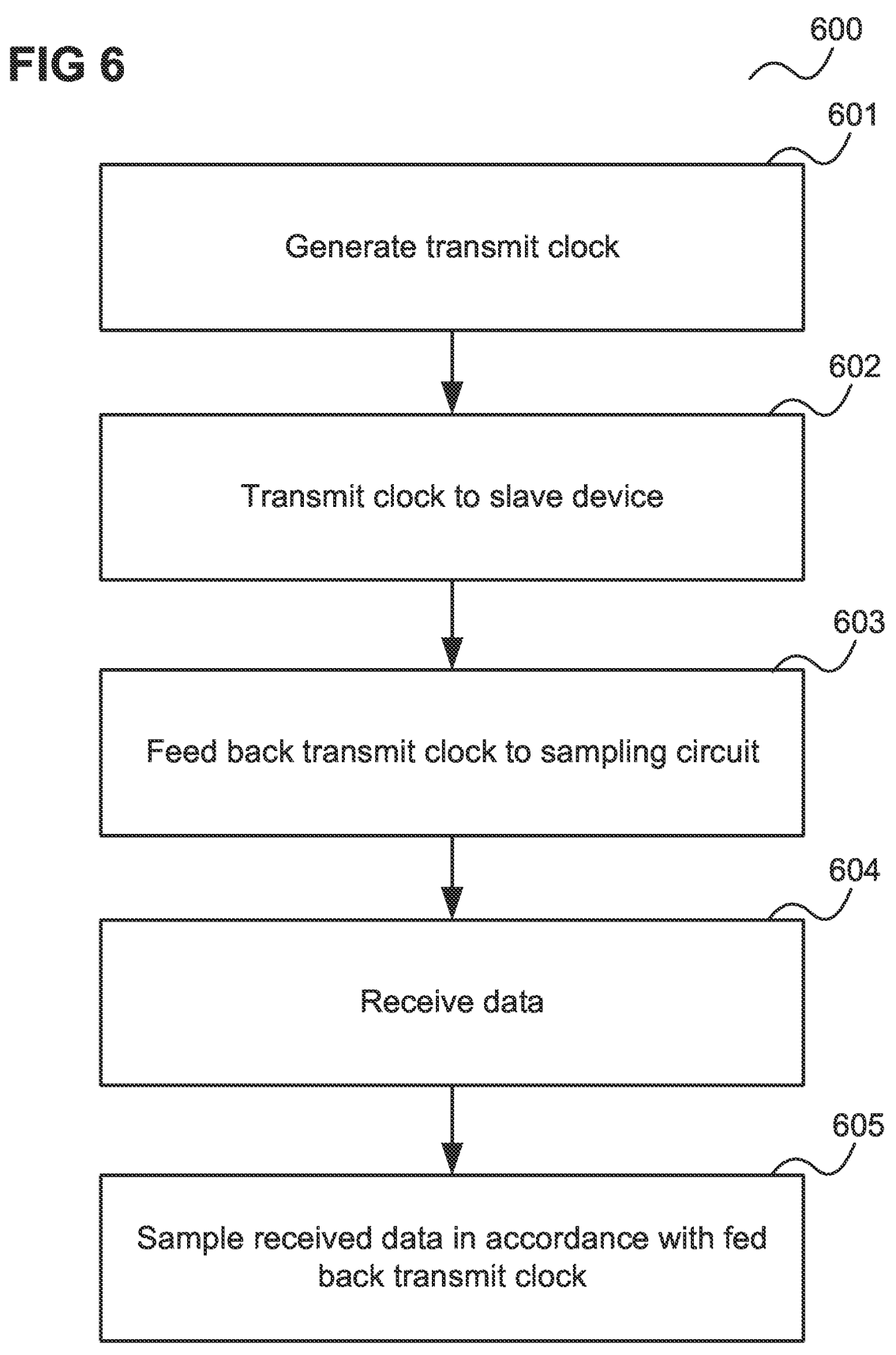
FIG. 6 shows a flow diagram illustrating a method for sampling received data according to an embodiment.

According to various embodiments, a method is performed as illustrated in FIG. 6.

FIG. 6 shows a flow diagram 600 illustrating a method for sampling received data (i.e. a received data signal) according to an embodiment.

In 601, a transmit clock is generated by a master device.

In 602, the transmit clock is transmitted from a master device to a slave device via a first off-chip driver of the master device.

In 603, the transmit clock is fed back to a clock input of a sampling circuit of the master device via (i.e. by) a second off-chip driver of the master device.

In 604, data is received from the slave device by the master device.

In 605, the received data is sampled by the sampling circuit in accordance with the transmit clock provided by the second off-chip driver.

Various Examples are described in the following.

Example 1 is an electronic device as described with reference to FIG. 5.

Example 2 is the electronic device of example 1, wherein the master device is a data processing device and the slave device is a memory.

Example 3 is the electronic device of example 1 or 2, wherein the slave device is a memory and the interface component is a memory controller.

Example 4 is the electronic device of any one of examples 1 to 3, wherein the master device and the slave device are arranged on a printed circuit board.

Example 5 is the electronic device of any one of examples 1 to 4, wherein the second off-chip driver comprises a transmit stage and a receive stage, wherein the transmit stage is configured to receive the generated transmit clock at its input and provide the received transmit clock at its output to the input of the receive stage, wherein the output of the receive stage is configured to supply the transmit clock to the clock input of the sampling circuit of the interface component.

Example 6 is the electronic device of any one of examples 1 to 5, comprising a first terminal connected to a clock input of the slave device, wherein the first off-chip driver is an off-chip driver of the first terminal and is configured to provide the transmit clock to the slave device via the first terminal.

Example 7 is the electronic device of any one of examples 1 to 6, comprising a second terminal, wherein the second off-chip driver is an off-chip driver of the second terminal.

Example 8 is the electronic device of any one of examples 1 to 7, wherein the second terminal is isolated from the slave device.

Example 9 is the electronic device of any one of examples 1 to 8, wherein the second off-chip driver is configured to supply the transmit clock to the clock input of the sampling circuit of the interface component via a delay locked loop.

Example 10 is the electronic device of any one of examples 1 to 9, comprising a multiplexer configured to switch between supplying the transmit clock from the second off-chip driver to the clock input of the sampling circuit and supplying a receive clock signal from the slave device to the clock input of the sampling circuit.

Example 11 is the electronic device of any one of examples 1 to 10, wherein the electronic device comprises the slave device.

Example 12 is the electronic device of any one of examples 1 to 11, wherein the slave device is configured to receive the transmit clock signal and to transmit the data in accordance with the transmit clock signal.

Example 13 is a method for sampling received data as described with reference to FIG. 6.

Example 14 is the method of example 13, wherein the master device comprises a plurality of off-chip drivers including a spare off-chip driver, wherein the spare off-chip driver is used as the second-off chip driver.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An electronic device comprising:
a master device comprising an interface component to a slave device, the interface component comprising:
a sampling circuit having a clock input;
a transmit clock generator configured to generate a transmit clock signal;
a first off-chip driver configured to receive the transmit clock signal and provide the transmit clock signal to the slave device;
a second off-chip driver configured to receive the transmit clock signal and provide the transmit clock signal to the clock input of the sampling circuit; and
a data input configured to receive data from the slave device;
wherein the sampling circuit is configured to sample the data received at the data input from the slave device in accordance with the transmit clock signal provided to the clock input by the second off-chip driver,

wherein the second off-chip driver comprises a transmit stage and a receive stage, wherein the transmit stage is configured to receive the transmit clock signal at an input of the transmit stage and provide the transmit clock signal at an output of the transmit stage to an input of the receive stage in response to receiving the transmit clock signal at the input of the transmit stage, wherein the receive stage is configured to provide the transmit clock signal at an output of the receive stage to the clock input of the sampling circuit in response to receiving the transmit clock signal at the input of the receive stage.

2. The electronic device of claim 1, wherein the master device is a data processing device and the slave device is a memory.

3. The electronic device of claim 2, wherein the interface component is a memory controller.

4. The electronic device of claim 3, wherein the master device and the slave device are arranged on a printed circuit board.

5. The electronic device of claim 1, further comprising:
a first terminal connected to a clock input of the slave device, wherein the first off-chip driver is an off-chip driver of the first terminal and is configured to provide the transmit clock signal to the slave device via the first terminal.

6. The electronic device of claim 5, further comprising:
a second terminal, wherein the second off-chip driver is an off-chip driver of the second terminal.

7. The electronic device of claim 6, wherein the second terminal is isolated from the slave device.

8. The electronic device of claim 1, wherein the electronic device comprises the slave device.

9. The electronic device of claim 1, wherein the slave device is configured to receive the transmit clock signal and to transmit the data in accordance with the transmit clock signal.

10. An electronic device comprising:
a master device comprising an interface component to a slave device, the interface component comprising:
a sampling circuit having a clock input;
a transmit clock generator configured to generate a transmit clock signal;
a first off-chip driver configured to receive the transmit clock signal and provide the transmit clock signal to the slave device;
a second off-chip driver configured to receive the transmit clock signal and provide the transmit clock signal to the clock input of the sampling circuit; and
a data input configured to receive data from the slave device;
wherein the sampling circuit is configured to sample the data received at the data input from the slave device in accordance with the transmit clock signal provided to the clock input by the second off-chip driver,
wherein the second off-chip driver is configured to supply the transmit clock signal to the clock input of the sampling circuit via a delay locked loop.

11. An electronic device further comprising:
a master device comprising an interface component to a slave device, the interface component comprising:
a sampling circuit having a clock input;
a transmit clock generator configured to generate a transmit clock signal;
a first off-chip driver configured to receive the transmit clock signal and provide the transmit clock signal to the slave device;

a second off-chip driver configured to receive the transmit clock signal and provide the transmit clock signal to the clock input of the sampling circuit; and a data input configured to receive data from the slave device;

wherein the sampling circuit is configured to sample the data received at the data input from the slave device in accordance with the transmit clock signal provided to the clock input by the second off-chip driver; and a multiplexer configured to switch between supplying the transmit clock signal from the second off-chip driver to the clock input of the sampling circuit and supplying a receive clock signal from the slave device to the clock input of the sampling circuit.

* * * * *